July 29, 1941.　　　R. T. CORNELIUS　　　2,250,749
BARREL
Filed April 6, 1939　　　2 Sheets-Sheet 1
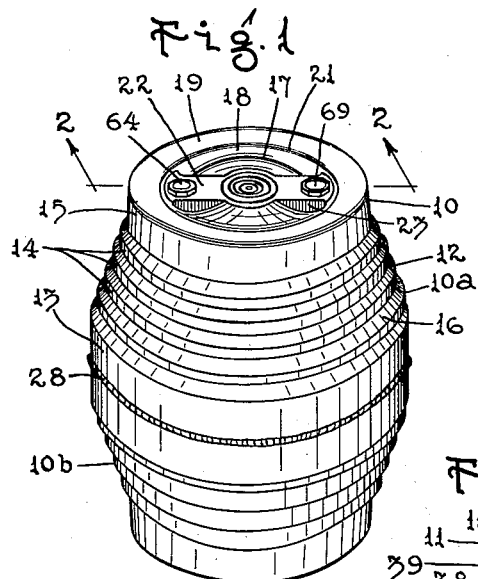
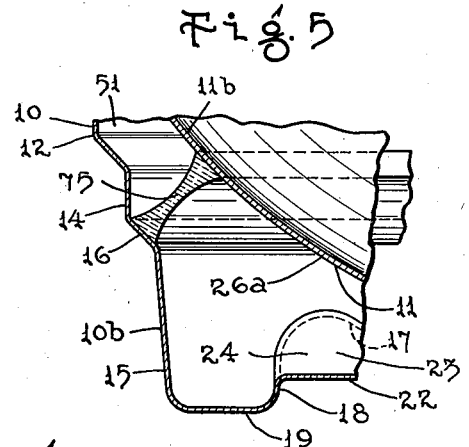
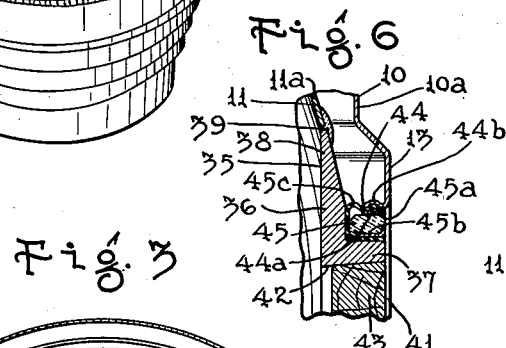
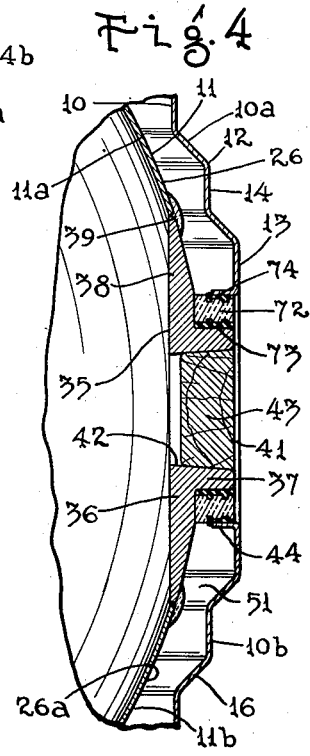
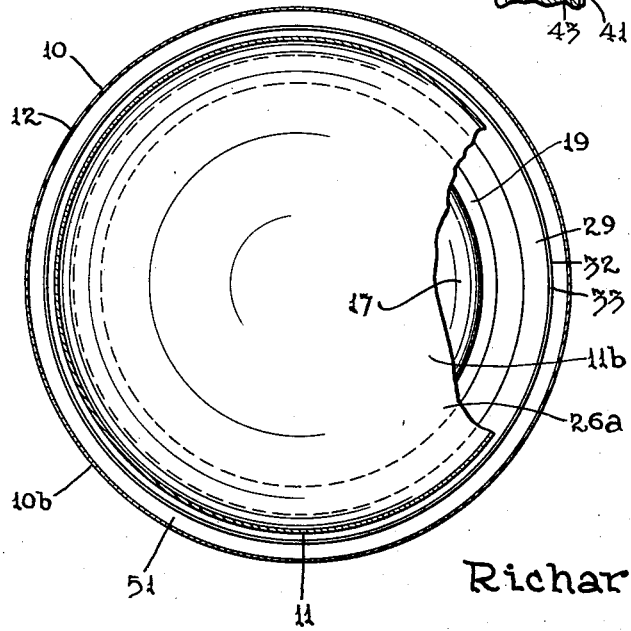
Inventor
Richard T. Cornelius
By Caswell & Lagaard
Attorney July 29, 1941.  R. T. CORNELIUS  2,250,749
BARREL
Filed April 6, 1939.  2 Sheets-Sheet 2

Inventor
Richard T. Cornelius
By Caswell & Lagaard
Attorneys

Patented July 29, 1941

2,250,749

UNITED STATES PATENT OFFICE 2,250,749

BARREL

Richard T. Cornelius, Minneapolis, Minn.

Application April 6, 1939, Serial No. 266,330

1 Claim. (Cl. 220—10)

My invention relates to barrels and has for an object to provide a barrel particularly usable for containing beer and similar beverages and constructed entirely out of metal.

An object of the invention resides in providing a barrel having an inner container constructed of aluminum and an outer shell constructed of steel.

Another object of the invention resides in polishing the exterior surface of the aluminum to retard heat transfer between the shell and container.

An object of the invention resides in supporting the container within the shell so as to prevent metal to metal contact between the container and shell.

A feature of the invention resides in employing spacer rings for holding the container in proper position.

An object of the invention resides in constructing the container spheroidal in form and the shell barrel-shaped with shoulders adapted to engage the spacer rings and hold the same in contact with the spheroidal surface of the container.

Another object of the invention resides in constructing the bung of the barrel so as to form an air tight seal between the container and shell to permit of evacuation thereof for insulating purposes and to construct the connection between the container and shell of heat insulating material to prevent direct metal to metal contact between the container and shell.

An object of the invention resides in the construction of the head of the barrel so as to form a raised portion providing a space within the interior of the barrel between the shell and container.

A feature of the invention resides in recessing in the raised portion of the head of the shell an instrument.

Other objects of the invention reside in the novel combination and arrangement of parts and in the details of construction hereinafter illustrated and/or described.

In the drawings:

Fig. 1 is a perspective view of a barrel illustrating an embodiment of my invention.

Fig. 3 is a plan sectional view taken on line 3—3 of Fig. 2.

Fig. 4 is a fragmentary longitudinal elevational view taken through the bung of the barrel and illustrating a modification of the invention.

Fig. 5 is a fragmentary elevational sectional view of the barrel taken through the supporting ring and illustrating a modification of the invention.

Fig. 6 is a fragmentary elevational sectional view of a portion of the bung shown in Fig. 2.

Figure 2:
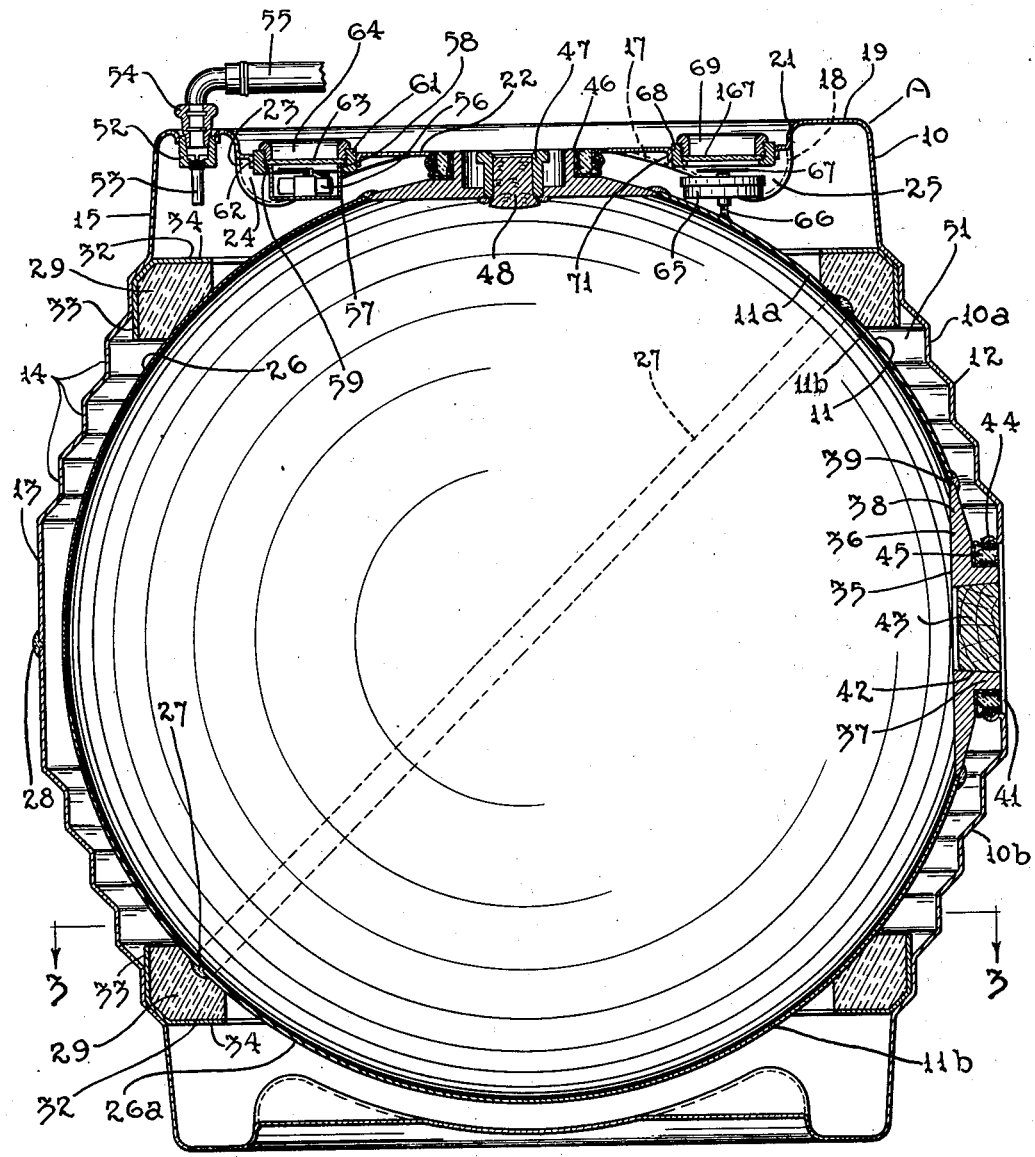
Fig. 2 is a longitudinal elevational sectional view taken on line 2—2 of Fig. 1.

In the construction of metal barrels, particularly for the use for beer and similar beverages, it has been customary to construct the barrels with an inner container and an outer shell both formed of steel, or to construct the barrel of a single member formed of aluminum. In the former construction the inner and outer parts have been welded together and considerable heat transfer occurs at the welded joints. Such barrels are also exceedingly heavy and require pitching or other treatment to prevent attack of the contents upon the metal of the container. Where the barrel is constructed entirely of aluminum, exceedingly thick walls must be used to withstand the pressure in the barrel and the shocks to which the barrel is subjected and such barrels readily become damaged and broken. At the same time the heat loss is terriffic though no preparation of the interior of the barrel is necessary. My invention overcomes the difficulty encountered by providing a barrel having a shell constructed of steel to conform with the shape of barrels now used in breweries and formed to stiffen the same so as to be capable of resisting shock. My invention further overcomes this difficulty by utilizing within the shell a container spheroidal in form so that an extremely light weight material may be used and still withstand the pressure to which it is subjected and completely heat insulated from the outer shell.

My invention comprises a barrel which I have indicated in its entirety by the reference character A. This barrel includes an outer shell 10 and an inner container 11 which will now be described in detail.

The shell 10 consists of two parts 10a and 10b which are substantially identical in construction. The same reference numerals will be used to indicate corresponding parts. The part 10a is formed with a circumferential wall 12 having a cylindrical portion 13 and stepped portions 14 reducing the diameter of the part 10a at the head end of the barrel. At this locality the circumferential wall is formed with a conical portion 15 which is constructed with an off-set portion 16, forming a shoulder issuing inwardly from the adjacent stepped portion 14. The end of the part 12 is constructed with a head 17 which is generally spherical in form and which is connected to a cylindrical portion 18. The later portion is connected to an anular rim 19 which, together with the portions 15 and 18, form a chine for the barrel which is designated by the reference numeral 21. Extending diametrally across the head 17 is a raised portion 22 which is tangent to the spherical portion of the head and which extends up to the wall 18 in proximity to the rim 19. This raised portion is connected by longitudinally extending walls 23 with the head proper to form two spaces within the shell indicated by the reference numerals 24 and 25. The two parts 10a and 10b of shell 10 are preferably constructed of steel and the formation of the shell by means of the stepped portions 14 and 15 the chine 21 greatly stiffen and reinforce the barrel and cause the same to resist shock.

The container 11, in the form of the invention shown, is spherical or spheroidal in form and consists of two parts 11a and 11b which are substantially identical in construction. The part 11a consists of a hemispherical wall 26 in the nature of a dome. This wall is welded along the open edge thereof as indicated at 27 to the corresponding edge of the wall 26a of the part 11b of container 11. By means of this weld a spheroidal shaped container is produced. For a purpose to be presently explained the container 11 is disposed within the shell 12 in such a position that the weld 27 extends diagonally of the said shell. In the drawings the container is illustrated as being in the shape of a true sphere though it can readily be comprehended that, if the weld 27 is disposed parallel to the ends of the shell 12, an exact spherical form of sphere may be departed from and the container made spheroidal as by the introduction of a cylindrical portion at the circumference of the shell indicated by the welded head 27 or by deviations of the dome portions of the container from the form of a true sphere.

The parts 10a and 10b of the shell 10 are welded together along a welding indicated at 28 whereby the free edges of the two parts 10a and 10b are secured together. This is accomplished after the container is inserted within the shell and the proper supports have been placed within the same.

The container 11 is held supported within the shell 10 by means of two rings 29 constructed of an insulating material such as cork or some other suitable substance. These rings directly bear upon the outer surface of the shell and are held supported within two annular holders 32. The two holders 32 engage the shoulders 16 and the parts 10a and 10b and are preferably welded to the same. These holders are constructed with cylindrical walls 33 and radial walls 34 which receive the rings 29 and hold the same in place. When the parts of the shell 10 are brought together the rings 29 are compressed and the welds 28 completed without sufficient transfer of heat to the rings 29 to injure the same.

In the side of the barrel formed by the cylindrical portions 13 of the shell 10 is provided a bung 35 which consists of a casting 36 having a neck 37 issuing outwardly from an annular flange 38. The flange 38 is of substantial dimensions and is welded along its peripheral edge to the shell 11 as indicated at 39. The neck protrudes outwardly through an opening 41 in the portions 13 of shell 10 and is itself constructed with an opening 42 to which access to the interior of the container 11 may be had. The opening 42 is preferably constructed tapered and is adapted to receive a conical plug 43 by means of which the opening may be closed. The opening 41 in the shell 10 is provided with a flange 44 which projects inwardly from the wall 13. This flange is spaced from the neck 37 and both said neck and flange are constructed with parallel concentric surfaces. Between these parts is disposed an insulating collar 45. Collar 45 is disposed between two metal rings 45a and 45b. A gasket of rubber or some other suitable material indicated at 45c surrounds the collar 45 and rings 45a and 45b. This assembly of parts is driven in between the flange 44 and neck 37 and which lies within the confines of the barrel. For holding the assembly in position a bead 44a is formed on ring 45a which fits into an annular groove 44b in flange 44. By means of this construction the container 11 may move relative to the shell 10 thereby resisting strains and preventing leakage of air into the space 51.

In the head 17 of the shell 10 is provided a bung 46 similar to the bung 35. This bung differs in that a tube 47 is formed within the neck of the bung to which the usual tap rod or tube may be secured. A cork 48 inserted into this tube closes the opening through the said bung. The bung is otherwise constructed similarly to the bung 35 and is heat insulated from the head of the barrel. By arranging the weld 27 as shown in Fig. 2 the bungs 35 and 46 are symmetrically disposed in the respective parts of the container of the barrel so that one stamping may be used for either part. Also the bungs are free from the edges of the parts so that the bungs may be welded to the parts before assembly and the completed parts welded together after the bungs are in place and without interference with the bungs.

By means of the annular gaskets 45 and the supporting rings 29 the container 11 is suspended within the barrel and maintained out of metal to metal contact with the shell 10. It will thus be seen that the transmission of heat from the barrel 11 is greatly reduced. To further reduce such heat transmission, the outer surface of the container 11 is polished so that heat waves striking the same are reflected back and prevented from entering the interior of the container.

To further resist in preventing heat transfer between the shell 10 and container 11 the space between these two parts, which is designated by the reference numeral 51, is evacuated. For this purpose a fitting 52 is mounted in the chine 19, which fitting is provided with a check valve 53. Fitting 52 permits of attachment of a stopper 54 which has secured to it a suction tube 55. Suction tube 55 is connected to any suitable vacuum pump by means of which the space 51 may be evacuated.

For the purpose of indicating the pressure or degree of evacuation of the space 51, a pressure gauge 56 is employed. This pressure gauge is attached to a case 57 which is constructed with a flange 58 adapted to rest on a shoulder 59 of an annular ring 61. Ring 61 is welded to a flange 62, formed in the raised portion 22 of the head 17. A window 63 covers the gauge 56 and rests upon the flange 58. A bezel 64, screwed into the ring 61, holds the window 63 in place and also holds the gauge properly mounted. The gauge is so situated that the same is disposed within the space 23 formed by the raised portion 22 of head 17. The gauge 56 communicates within the space 51 between the container 11 and the shell 10. It will thus be seen that the pressure within the space 51 will be accurately indicated by the gauge 56 and the scale thereof viewed through the window 63. The bezel 64 is made of substantial construction so as to be capable of protecting the window 63. The gauge proper is recessed within the portion 42 of head 17 and is itself completely covered so as to protect it from shock.

In order to indicate the temperature of the container 11, a thermometer 65 is employed. This thermometer is mounted on a stud 66, welded or otherwise attached to the container 11. The said thermometer has a pointer 67 which is disposed above the same, and which is operated by an expansible element disposed in heat conducting relation to the stud 66. In the raised portion 22 of the head 17 is provided a window 167 which is situated directly above the pointer 67 and the scale of the thermometer 65. This window is received within a ring 68, similar to the ring 61, and is held mounted in said ring by means of a bezel 69. Ring 68 is welded to a flange 71 formed on the portion 22 of head 17. It will be noted that the window 67 is directly above the thermometer 65, but that all of the parts of the same are spaced from said thermometer so that heat transfer from the shell 10 to the thermometer 65 is extremely small. In this manner the thermometer accurately indicates the temperature of the container 11 without being effected by the temperature of the shell 10 of the barrel.

The use of the invention is as follows: The container 11 is cooled by washing the same with cold water and the beer or other beverage to be contained within the said container is filled into the container 11 through the bung 35. Both the corks 48 and 43 are applied to close the container. After filling of the barrel the air within the space 51 is evacuated through the check valve 53 and the hose 55. The barrel is then shipped to its destination. Upon arrival the temperature and pressure of the barrel in the container 11 are noted and likewise the degree of vacuum in the space 51. The usual tap tube is next applied by forcing the cork 48 into the interior of the container 11 and the said device attached in the customary manner. Evacuation of the space 51 is then corrected if the vacuum has dropped and pressure within the container regulated to correspond to the temperature indicated by the thermometer 65. The beer may then be dispensed in the usual manner.

In Fig. 4 I have shown a modification of the bung using a different type of insulating material. In this modification, corresponding parts will be designated by the same reference numerals and the description thereof will not be repeated. Instead of the collar 45 another collar 72 is employed which is constructed of a different type of insulating material. This construction embodies an insulating material which is relatively hard and incapable of appreciably yielding. Said collar has moulded on the internal and external surfaces thereof annular rubber cushion pads 73 and 74. These pads directly engage the flange 44 and neck 37 and provide the desired degrees of resiliency between the container 11 and shell 10. The bung 46 may, if desired, be constructed in the same manner.

Instead of the cork or similar insulating ring 29 used for supporting the container 11 within the shell 10, a ring 75, such as shown in Fig. 5, may be employed. This ring is considerably narrower than the ring 29 being constructed of a hard insulating material. When such a ring is used, the holders 32 may be disposed with and the ring mounted directly against the shoulder 16.

The advantages of my invention are manifest. An extremely serviceable barrel is produced which can be constructed at a reasonable cost. Due to the use of aluminum for the inner container, pitching or other treatment of the container when used for beer becomes unnecessary. By the use of the double wall container the barrel may be evacuated and heat losses greatly reduced. By the use of the supporting rings constructed of insulating material and the collars in the bungs also constructed of insulating material, the inner container is suspended within the shell without metal to metal contact therewith. In this manner heat losses are reduced to a minimum. By constructing the inner container spherical or spheroidal in shape, an extremely thin gauge of metal may be used for the formation of the container. At the same time sufficient strength is procured to withstand the pressure within the container and the shocks to which the barrel is subjected. When the container is constructed for a given capacity for example a half barrel, the outer shell may be constructed to conform to standard practice in connection with wooden barrels so that the barrels may be stacked one upon the other and also upon wooden barrels. Likewise the barrel may be filled, cleaned and handled with the existing machinery and equipment now available for the purpose and with which breweries are at the present time equipped, thereby not necessitating new machinery or equipment. By constructing the outer shell in the manner indicated with stepped surfaces considerable rigidity is procured and the barrel is capable of resisting appreciable shock and will remain serviceable for a considerable length of time. By recessing the instruments in the raised portion of the barrel head, the instruments are protected and disposed out of the way.

Changes in the specific form of my invention, as herein disclosed, may be made within the scope of what is claimed without departing from the spirit of my invention.

Having described my invention, what I claim as new and desire to protect by Letters Patent is:

A barrel comprising a barrel shaped shell, a spherical shaped container within the shell, said shell having a bung in one end of the barrel communicating with said container and a similar bung in the side of the barrel communicating with the container, said container being constructed of two hemispherical dome shaped parts connected together at their edges to form a circumferentially extending seam therebetween, each of said parts having an opening therein communicating with one of said bungs, said openings being substantially of the same dimensions and being situated substantially the same distance from the seam to make both parts substantially identical in construction and to provide in each part substantially equal amounts of material between the edges of the openings and the closest portions of the seam.

RICHARD T. CORNELIUS.